US009197913B2

(12) United States Patent
Pedlow et al.

(10) Patent No.: US 9,197,913 B2
(45) Date of Patent: Nov. 24, 2015

(54) SYSTEM AND METHOD TO IMPROVE USER EXPERIENCE WITH STREAMING CONTENT

(75) Inventors: Leo Pedlow, Ramona, CA (US); True Xiong, San Diego, CA (US)

(73) Assignees: SONY CORPORATION, Tokyo (JP); SONY NETWORK ENTERTAINMENT INTERNATIONAL LLC, Los Angeles, CA (US)

(*) Notice: Subject to any disclaimer, the term of this patent is extended or adjusted under 35 U.S.C. 154(b) by 0 days.

(21) Appl. No.: 13/433,476

(22) Filed: Mar. 29, 2012

(65) Prior Publication Data

US 2013/0263169 A1    Oct. 3, 2013

(51) Int. Cl.
| | |
|---|---|
| *H04N 21/24* | (2011.01) |
| *H04N 21/472* | (2011.01) |
| *G06Q 30/02* | (2012.01) |
| *H04N 21/2187* | (2011.01) |
| *H04N 21/237* | (2011.01) |
| *H04N 21/262* | (2011.01) |
| *H04N 21/488* | (2011.01) |
| *H04L 29/06* | (2006.01) |
| *H04L 29/08* | (2006.01) |

(52) U.S. Cl.
CPC .......... *H04N 21/2408* (2013.01); *G06Q 30/02* (2013.01); *H04N 21/2187* (2013.01); *H04N 21/237* (2013.01); *H04N 21/2407* (2013.01); *H04N 21/2625* (2013.01); *H04N 21/472* (2013.01); *H04N 21/4882* (2013.01); *H04L 65/4084* (2013.01); *H04L 67/142* (2013.01); *H04L 67/32* (2013.01)

(58) Field of Classification Search
CPC ............ H04N 21/472; H04N 21/4882; H04N 21/237; H04N 21/2407; H04N 21/2408; H04N 21/2625; H04N 21/2187; H04L 65/4084; H04L 67/32; H04L 67/142; G06Q 30/02
USPC ............................................................ 725/16
See application file for complete search history.

(56) References Cited

U.S. PATENT DOCUMENTS

| | | | | |
|---|---|---|---|---|
| 6,944,658 | B1 * | 9/2005 | Schneider | 709/224 |
| 6,996,627 | B1 * | 2/2006 | Carden | 725/39 |
| 2001/0047516 | A1 * | 11/2001 | Swain et al. | 725/86 |
| 2003/0061280 | A1 * | 3/2003 | Bulson et al. | 725/32 |
| 2003/0140092 | A1 * | 7/2003 | Caruso et al. | 709/203 |
| 2003/0229899 | A1 * | 12/2003 | Thompson et al. | 725/87 |
| 2007/0022437 | A1 * | 1/2007 | Gerken | 725/41 |
| 2008/0307485 | A1 * | 12/2008 | Clement et al. | 725/152 |

(Continued)

FOREIGN PATENT DOCUMENTS

| | | |
|---|---|---|
| WO | 2010024646 A1 | 3/2010 |
| WO | 2010075743 A1 | 7/2010 |

*Primary Examiner* — Randy Flynn
(74) *Attorney, Agent, or Firm* — Mark D. Wieczorek; Mayer & Williams PC

(57) ABSTRACT

Provided are systems and methods for improving a viewing experience of a user during consumption of streamed content. In one implementation, the systems and methods relate to a model of polling a live streaming event by a management server of a service provider server and using that model to feed into future polling. The polling response returns up-to-date information about an event to be viewed. The system and method model the polling frequency and enter the same in an algorithm such as a supervised machine learning algorithm. This algorithm is presented as a mathematical formula and provides an input to the polling system to determine when to poll and how frequently to poll.

19 Claims, 10 Drawing Sheets

(56) References Cited

U.S. PATENT DOCUMENTS

| | | | |
|---|---|---|---|
| 2011/0078717 A1* | 3/2011 | Drummond et al. | 725/14 |
| 2011/0296463 A1* | 12/2011 | Suslov | 725/44 |
| 2013/0254822 A1* | 9/2013 | Alam et al. | 725/112 |

* cited by examiner

SYSTEM AND METHOD TO IMPROVE USER EXPERIENCE WITH STREAMING CONTENT

BACKGROUND

Infrastructures exist to provide Internet video from various service providers or services. For example, the Sony Bravia® Internet Link ("BIVL") technology from Sony Corporation provides a hardware device which when coupled to a broadband Internet connection allows access to Internet video services through a management server infrastructure. Such infrastructures deliver recorded audiovisual media content such as video, music, and audio files.

While such infrastructures are powerful, user experience can vary. For example, in some cases a lack of a standard or common way to access content can be frustrating to a user. Particularly at television viewing is commonly used for relaxation, a viewer's experience should be one of ease and convenience. Hurdles to viewing should be removed, and as much as possible the viewer's experience should be simply one of choosing content and viewing.

Streaming refers to a delivery of media content in a constant fashion, from a transmission at a source to a reception and presentation at a receiver. For example, Internet delivery of digital content presentations to network computers is commonly streamed, as is Internet television content.

Streamed content can include content that is pre-recorded or live. One type of live streamed content are popular events such as concerts and sporting events. One inconvenience associated with such live streamed content is that the event may not begin at an advertised time, and the user may encounter frustration and annoyance of not knowing when to begin watching. At a more technical level, the system may on-demand poll the service provider for the event, and if millions of other viewers are doing the same, server load may become a problem for the service provider server.

In a particular example, a major football game may be scheduled to start in an hour and may be displayed as a live streaming asset or content item on a user interface grid to a user. The user may have made many preparations for the event. After some time, the user may select the football game to start viewing the content. A "coming later" poster may be presented to the user after an on-demand polling to the service provider server hosting the game. The user may exit and come back after thirty minutes, and the user may subsequently be presented with a "coming soon" poster after an on-demand polling to the service provider server hosting the game. The user may then await additional time, only to find out that the game has been delayed. Such can be a source of significant frustration and annoyance to the user. On the technical level, the impact on the service provider server due to load traffic and frequent polling is also significant. Hundreds of requests may not be a concern in terms of request load and availability, but polling by millions of IPTV devices would be a significant problem for a service provider server.

SUMMARY

Systems and methods are provided for improving a viewing experience of a user during consumption of streamed content items, also termed herein assets (the terms are used interchangeably). Viewing experiences may be improved in a number of ways. In one particular implementation, which is especially applicable to live streaming, a viewing experience is improved by reducing the frustration of a user while waiting for an event to start.

In particular, the systems and methods relate to polling a service provider server for the beginning of an event, allowing a user to watch the beginning of an event as soon as it is available, but without having to constantly and manually check for availability. Live events, which often have scheduled start times that do not coincide with actual start times, are often particularly frustrating for users. Consequently, systems and methods disclosed here include a model of polling a live streaming event by a management server of a service provider server and using that model as an input to future polling. The polling response returns up-to-date information about an event to be viewed. The system and method model the polling frequency and include the same within a supervised machine learning algorithm to a polling system. The algorithm may be configured as a mathematical formula and provides an input to the polling system to determine when to poll and how frequently to poll.

To more fully enhance a user's viewing experience, refinements may be made to the polling, display of content items, and ways of notifying users of start and end times. These refinements may take advantage of various sources of data, both gathered and calculated. For example, to enhance the specificity of posters displayed on client devices, as well as to indicate when an actual event start date is occurring, an event signal source may be employed. The same may be manually operated, from, e.g., a producer at the event, or the same may employ machine vision or other optical recognition techniques to automatically detect when one or more features of an event are occurring. For example, the enhanced specificity may include information about events taking place, e.g., halftime, a kick-off, or the like.

Inputs to the polling frequency may also take into account the type of event. For example, a football game may have a high threshold of timeliness, while a nature program less so. Other inputs may include demographic data or the like.

Posters may appear on a grid of potential content items available for future viewing, or the user may "park" on a page devoted to the streamed content item, and simply wait for the same to flip to the content item when an actual start time is reached. User notifications are not limited to posters. Notifications of the start of a content item may be delivered to a user by way of text messaging, email, an announcement over an audio system, or the like. So long as such devices are associated with the infrastructure including the service provider, e.g., through the local network, the same may be used for notifications.

User actions can influence the display of content items, as well as the type of actions or features within an event which will trigger a notification that a user should begin watching. For example, the user's viewing behavior may influence content items that are recommended or suggested to the viewer. Even more, and in an exemplary case, if a viewer habitually skips pregame festivities and only tunes in at a kickoff, the supervised machine learning algorithm may learn to notify the user especially at kickoff times. To the extent such can be derived from scheduled start times, the same may provide a further input to the polling frequency, e.g., polling may increase immediately prior to such times. In the same way, if a viewer takes no action during certain viewing sessions, it may be deduced that the content items streamed have a lesser significance to the user.

In any implementation, a user may select content for streaming in any number of ways, including using a standard remote control in combination with a content playback device or using a second display, the former being associated with a user account and the latter optionally so associated. The use of second display devices in such contexts has certain benefits because the same provides complementary functionality to the IPTV, but generally does not require additional investment by the user because the same make use of a device, e.g., a smartphone, which most users already have in their possession. Additional details about such second displays and their interactions with content playback devices, e.g., through proxy servers and otherwise, may be seen from Applicants' co-pending U.S. patent application Ser. No. 13/077,181, filed Mar. 31, 2011, entitled "PERSONALIZED SECOND DISPLAY BROWSING EXPERIENCE DUE TO MULTIPLE SESSION FEATURE", owned by the assignee of the present application and incorporated herein by reference in its entirety.

Where second displays are employed, the same may include any device that can run an application that communicates with a content playback device, including, but not limited to, personal computers, desktop computers, laptop computers, notebook computers, netbook computers, hand-held computers, personal digital assistants, mobile phones, smart phones, tablet computers, hand-held gaming devices, gaming consoles, Internet appliances, and also on devices specifically designed for these purposes, in which case the special device would include at least a processor and sufficient resources and networking capability to run the second display application.

In a general method using a second display, a user has an account with a source or clearinghouse of services. Here, the source or clearinghouse is represented as a management server, but it should be understood that the user account may be with a service provider directly. The management server communicates with at least one service provider server such that the service provider server provides content items such as streaming assets for presentation or access at the content playback device. The user account has information stored thereon related to what content playback devices are associated therewith. When a user logs on, they may see this list of content playback devices and may choose a particular content playback device. Once a content playback device has been chosen, a list of services may be displayed from which the user may choose. From a chosen service, a user may select a content item for streaming viewing, undergoing an affiliation or authentication step if required by the service provider. Additional details may be found in the application incorporated by reference above.

Various aspects of the system, especially in combination with a hosting server, are described in co-pending U.S. patent application Ser. No. 13/360,295, filed Jan. 27, 2012, entitled "SYSTEM, METHOD, AND INFRASTRUCTURE FOR REAL-TIME LIVE STREAMING CONTENT", owned by the assignee of the present application and incorporated by reference herein in its entirety.

In one aspect, the invention is directed towards a method for improving a viewing experience of a user with respect to a streamed asset, including: establishing a user account session between a second display or content playback device and a management server; using a polling system, polling a service provider server to determine if live streaming of an event has begun, the event associated with a scheduled starting time; and if the live streaming has not begun, displaying an indication on a user interface associated with the second display or content playback device, the indication at least in part dependent on the time difference between a current time and the scheduled starting time, and repeating the polling at a frequency, the frequency at least in part based on to the time difference between the current time and the scheduled starting time.

Implementations of the invention may include one or more of the following. The polling system may be associated with a hosting server, a management server, or a service provider server. The polling may be performed in response to a selection of an asset associated with the event. The method may further include, if the live streaming has begun, displaying the asset. The method may further include displaying a plurality of indications on the user interface of the second display or content playback device, the plurality of indications associated with a respective plurality of potentially available assets. The frequency may be inversely proportional and monotonically varying with respect to the time difference between the current time and the scheduled starting time. The frequency may be determined by a supervised machine learning algorithm.

In another aspect, the invention is directed towards a non-transitory computer-readable medium, including instructions for causing a computing device to implement the above method.

In another aspect, the invention is directed towards a method for improving a viewing experience of a user, including: polling a service provider server to determine if a live streaming of an event has begun, the event associated with a scheduled starting time; if the live streaming has begun, displaying an indication of an availability of an asset corresponding to the live streaming on a user interface of at least one second display or content playback device; and if the live streaming has not begun, displaying an indication on a user interface of at least one second display or content playback device, the indication at least in part dependent on the time difference between a current time and the scheduled starting time, and repeating the polling at a frequency, the frequency determined at least in part based on the time difference between the current time and the scheduled starting time.

Implementations of the invention may include one or more of the following. The method may further include: establishing a user account session between a second display or content playback device and a management server; receiving an indication from the second display or content playback device of an asset to be streamed; if the streaming has begun, displaying an indication of an availability of the asset on a user interface of the second display or content playback device; and if the streaming has not begun, displaying an indication on a user interface of the second display or content playback device, the indication at least in part dependent on the time difference between a current time and the scheduled starting time, and repeating the polling at a frequency, the frequency determined at least in part based on the time difference between the current time and the scheduled starting time. The method may further include displaying a plurality of indications on the user interface of the second display or content playback device, the plurality of indications associated with a respective plurality of potentially available assets. The indication may be further dependent on external data. The external data may include a signal from an event signal source. The frequency may be inversely proportional and monotonically varying with respect to the time difference between the current time and the scheduled starting time. The frequency may be determined by a supervised machine learning algorithm. The displaying an indication may further include choosing an indication to display based on information associated with the user. The information may include a user profile, a user transaction or browsing or watching history, user preferences, or user information in a social networking site. The method may further include notifying a user of an aspect of an event, the notifying by way of a poster, a text message, an email, or an audio announcement.

The notifying may further include determining an aspect to notify about, the aspect determined by analysis of at least a user's viewing history. The polling may begin at a first predetermined time prior to the scheduled starting time. The method may further include: at a second predetermined time prior to a scheduled end time, performing polling to determine if streaming of the content item has concluded or if a new end time is projected; and repeating the polling at a second frequency, the second frequency inversely proportional to the time difference between the current time and the scheduled end time or new end time.

In another aspect, the invention is directed towards a non-transitory computer-readable medium, including instructions for causing a computing device to implement the above method.

Advantages of certain implementations of the system and method may include one or more of the following. The system and method provide users with up-to-date information about live streaming events without sending wasteful traffic to the service provider server, thereby enhancing the user's viewing experience without deleteriously affecting server load. The system and method can even more fully enhance a user's viewing experience by suggesting or recommending content items calculated to be of interest to the user, and the machine learning algorithm may further learn what aspects or features of an event are of particular interest to a user, and thus what the user should be notified about. Such notifications may be conveniently made on a second display such as a smart phone, e.g., via text messaging, freeing the user to perform other tasks while waiting for a desired aspect or feature of a program to begin. In some implementations, by limiting suggested content to only what a user is interested in, the chance of a viewer's consumption of that content is significantly increased.

Other advantages will be apparent from the description that follows, including the figures and claims.

BRIEF DESCRIPTION OF THE DRAWINGS

Like reference numerals denote like elements throughout.

FIG. 10 illustrates an exemplary computing environment, e.g., that of the disclosed IPTV or client device, management server, proxy server, hosting server, second display, or the like.

DETAILED DESCRIPTION

Figure 1:
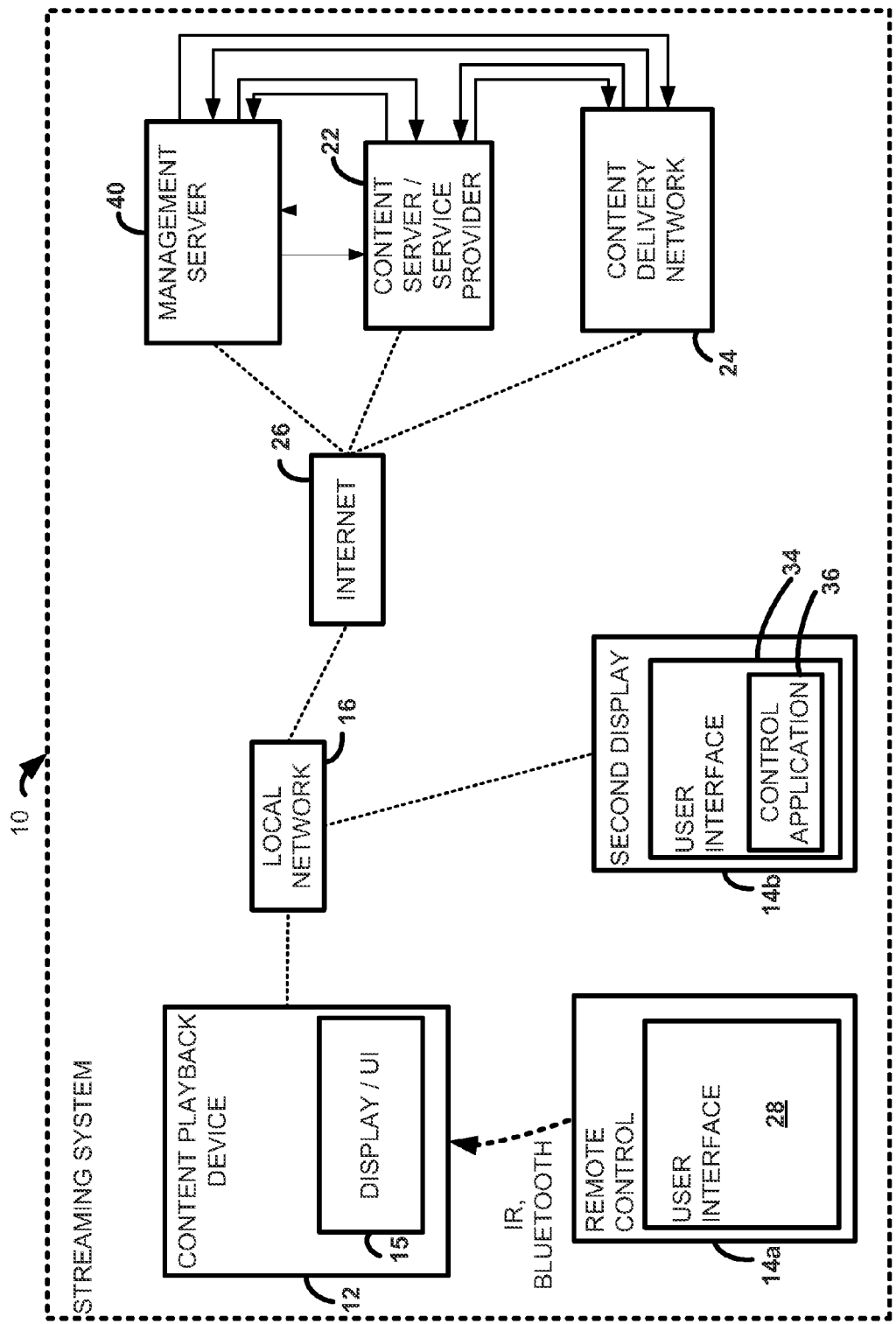
FIG. 1 is a block diagram of an exemplary system in accordance with an aspect of the present principles, illustrating a management server and content delivery network which may be employed to deliver streaming or video-on-demand content to a content playback device.

Referring to FIG. 1, a system 10 is shown including a content playback device 12 coupled to a local network 16, which may be wired, wireless, or a combination of both. Also coupled to the local network 16 are one or more remote controls 14a, which may be of any type capable of providing input through a user interface 28 to control content playback device 12 through its user interface 15. Besides the remote control 14a, a second display 14b may also be employed to control content playback devices on the local network 16. The second display 14b may employ a user interface 34 running a control application 36. The second display 14b may in some cases be a laptop, tablet, handheld computer, or other Internet appliance, or may include a mobile device such as a smart phone, which may be directly connected to the Internet 26 or to the local network 16, or both. Other types of second displays will also be understood, including desktop computers or the like. The control application 36 may operate the content playback device through the local network 16 either as part of the local network or even from a location external to the local network.

A number of servers may be accessed by the content playback device 12 through the local network 16 and the Internet 26, including a management server 40 and one or more service provider servers 22 (only one is shown in FIG. 1). The servers may in some cases communicate with a content delivery network 24 to enable content items to be delivered to the content playback device 12.

With the system 10 of FIG. 1, the user is provided with a convenient and flexible way to view streamed content items.

Figure 2:
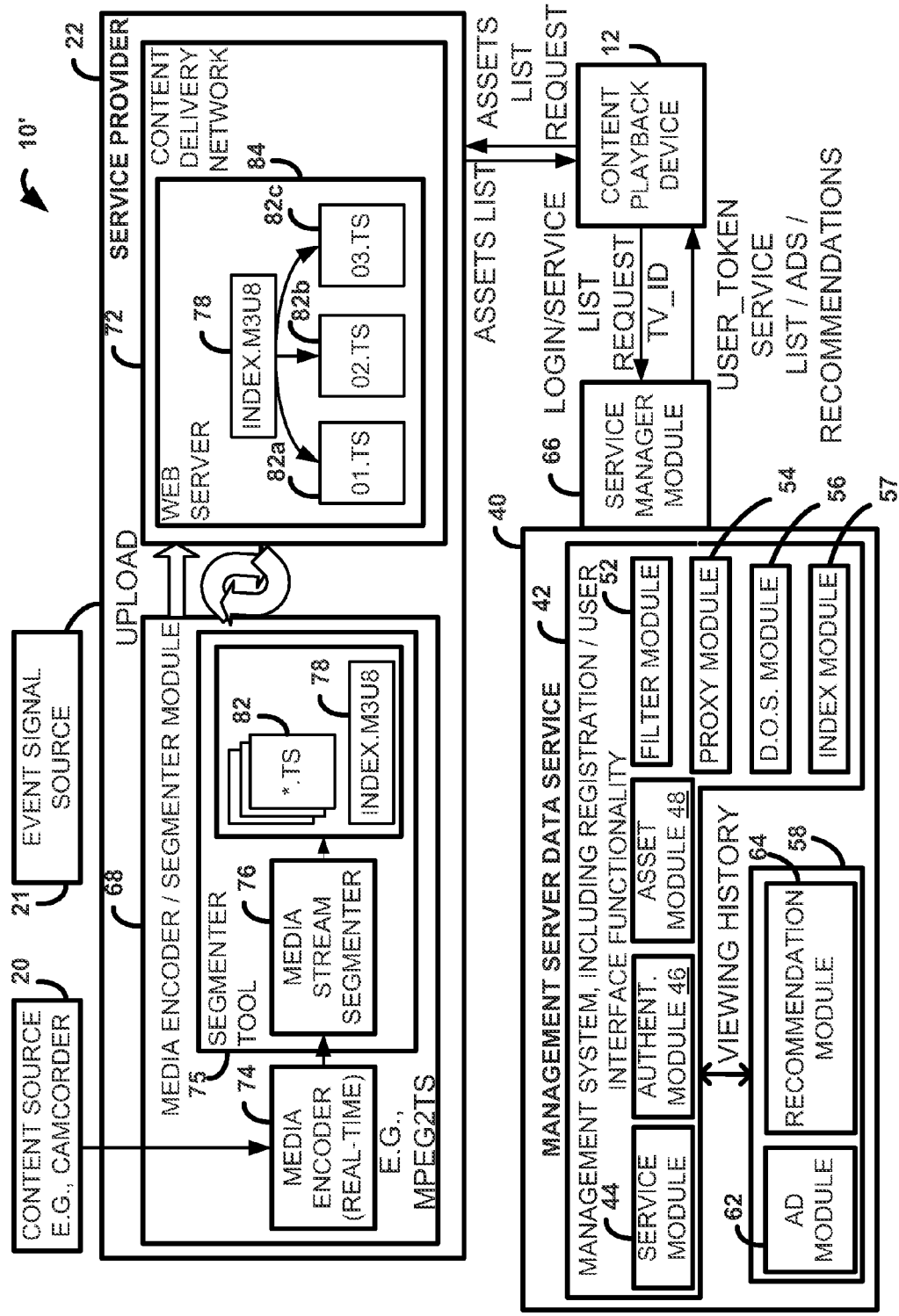
FIG. 2 is a block diagram of a more detailed exemplary system in accordance with an aspect of the present principles, illustrating a management server and content delivery network which may be employed to deliver streaming or video-on-demand content to a content playback device.

A more detailed implementation of the system is illustrated in FIG. 2, in which a system 10' is shown in which the content playback device 12 is coupled to a management server 40 through a service manager module 66. The content playback device is also coupled to the service provider 22. The coupling of the content playback device 12 to the management server 40 and the service provider 22 is generally through the local network 16 and Internet 26.

The service manager module 66 provides the initial gateway for content between the content playback device and the management server 40. When the content playback device 12 requests a login to the management server 40, it provides a TV_ID to the service manager module 66. Using the TV_ID the management server 40 can determine the client device capabilities, e.g., in terms of streaming. The service manager module 66 in turn returns a user token to the content playback device 12. Authentication by the service manager module 66 allows the content playback device to access the management server infrastructure and see available services. Thus, following such login, the content playback device may request a list of available services from the management server, and such list may be returned to the content playback device. The content playback device 12 may then request a service, an asset within the service, or the like. Generally access of a particular service and the assets thereof will require affiliation and/or authentication with that service. Additional details of such methods are disclosed in the patent applications incorporated by reference above, as well as in FIG. 5 and its accompanying description.

The management server 40 provides a data service with a number of functions through various modules. While these are discussed in greater detail in the application incorporated by reference above, here it is noted that an authentication module 46 may be provided to allow the authentication of client devices such as content playback devices, e.g., IPTVs, if such is not provided by the service manager module. A service module 44 may be employed to provide a service list to the content playback device 12. An asset module 48 may be provided to deliver a list of assets corresponding to a service as may be provided by the service module 44. It is noted that in some cases user selection of a service may lead to delivery of a streaming asset, while in other cases, user selection of a service leads to a list of assets or categories of assets for selection. In implementations described here, selection of the service may lead to presentation of a grid of available content items, e.g., organized by whether they are video-on-demand, real-time live streaming, upcoming in the future, or the like. The "posters" described, which generally provide a user with information about the availability of a streamed content item, may appear on the grid. Alternatively, if a user has already selected a grid option or asset, may appear on a screen devoted to the asset.

A filter module 52 may be provided to filter assets or services from being delivered to a content playback device, based on various factors. A proxy module 54 may be provided to serve a proxy function with respect to URIs of content items which are sent to a requesting content playback device. Another module illustrated in FIG. 2 is a D.O.S. module, or "denial of service" module 56. The denial of service module 56 may be employed to test if a content playback device 12 is acting in a malicious manner.

A viewing or transaction history associated with the user account may be employed to personalize management server functionality, including to preferentially display streaming content items that are determined to be of likely interest to a user. Such personalization modules are illustrated in element 58. In one case, an advertising module 62 may be employed to tailor ads delivered to a user based on user tastes as determined by a number of factors, these factors and methods described in U.S. patent application Ser. No. 13/313,740, filed Dec. 7, 2011, entitled "METHOD AND SYSTEM FOR ADVERTISEMENT CHOICES USING A SECOND DISPLAY DURING CONTENT PLAYBACK", owned by the assignee of the present application and incorporated by reference herein in its entirety. A recommendation module 64 may further be employed to provide recommendations of additional content items, or advertisements, based on a user viewing history, a viewing history of affiliated users such as may be listed on a friends list, or other such factors. Additional details of personalization are described below in connection with FIG. 9 and its accompanying description.

Once the management server 40 has authenticated the client device in an appropriate manner, the management server may provide the content playback device 12 with a URI to access streaming or video-on-demand content from a service provider 22, generally by providing a URI to an index file via an index module 57.

The service provider 22 is illustrated with a number of components, and these components may be distributed in a number of ways, the distribution in FIG. 2 being merely one of these ways. The service provider 22 may provide its streamed or video-on-demand content by way of a content delivery network 72 which hosts files on a web server 84. Each such file typically includes an index file, which may be in one implementation in the format .m3u8, and the index file may provide a URI to a number of transport stream files 82a-82c, e.g., 01.ts, 02.ts, 03.ts, and so on.

The streamed content files may be provided to the web server in this fashion or may be created using a media encoder and segmenter module 68. The media encoder and segmenter module 68 is illustrated as being part of the service provider 22, but it will be understood that the same may be hosted entirely separately.

As shown in the figure, generally a flow starts at a source of content 20, e.g., a camcorder file or other such audiovisual file, feeding into the media encoder and segmenter module 68. Concurrently, an event signal source 21 may provide data to the service provider 22 about aspects or features of the event, these aspects or features being of potential interest to viewers. The event signal source may be manually operated or may be triggered automatically, e.g., using various types of optical recognition techniques.

A media encoder 74 encodes an incoming audiovisual media stream, e.g., live or prerecorded, into an encoded format such as MPEG2-TS. The encoded stream feeds into a segmenter module 75, which at a segmenter 76 slices the stream into one or more streams or files, e.g., which durations are arbitrary but are generally of equal length for better performance. An index file is then generated which contain URIs to the sliced streams or files. In the figure, the index file is an M3U8 file with filename extension ".m3u8", and the same contains URIs to files with filename extension ".ts".

Before an IPTV client can be provided with knowledge of the location of the files, the client is authenticated by the service manager module 66. Authenticated IPTV clients may indicate their support for streaming content and may be presented with services and/or assets as described above. When a streaming service is selected, a mixed list of both live streaming and video-on-demand audiovisual content assets may be displayed. Upon selection of an asset, the service provider and the management server will generally perform authentication for the selected service or asset as required. As will be described below, authentication may also be provided by a hosting server. For example, if a service requires a separate step of affiliating or of verifying affiliation, the affiliation may be performed along with any needed authentication of the client device. Once authenticated, the IPTV client can decrypt the encrypted .ts files and begin streaming content playback.

Besides defining a streaming service and a way for client devices to access and obtain streaming content, a separate hosting server may be employed to host metadata and provide security, authentication, and other functions for service providers. In this way, service providers need not build such streaming infrastructure themselves.

Figure 3:
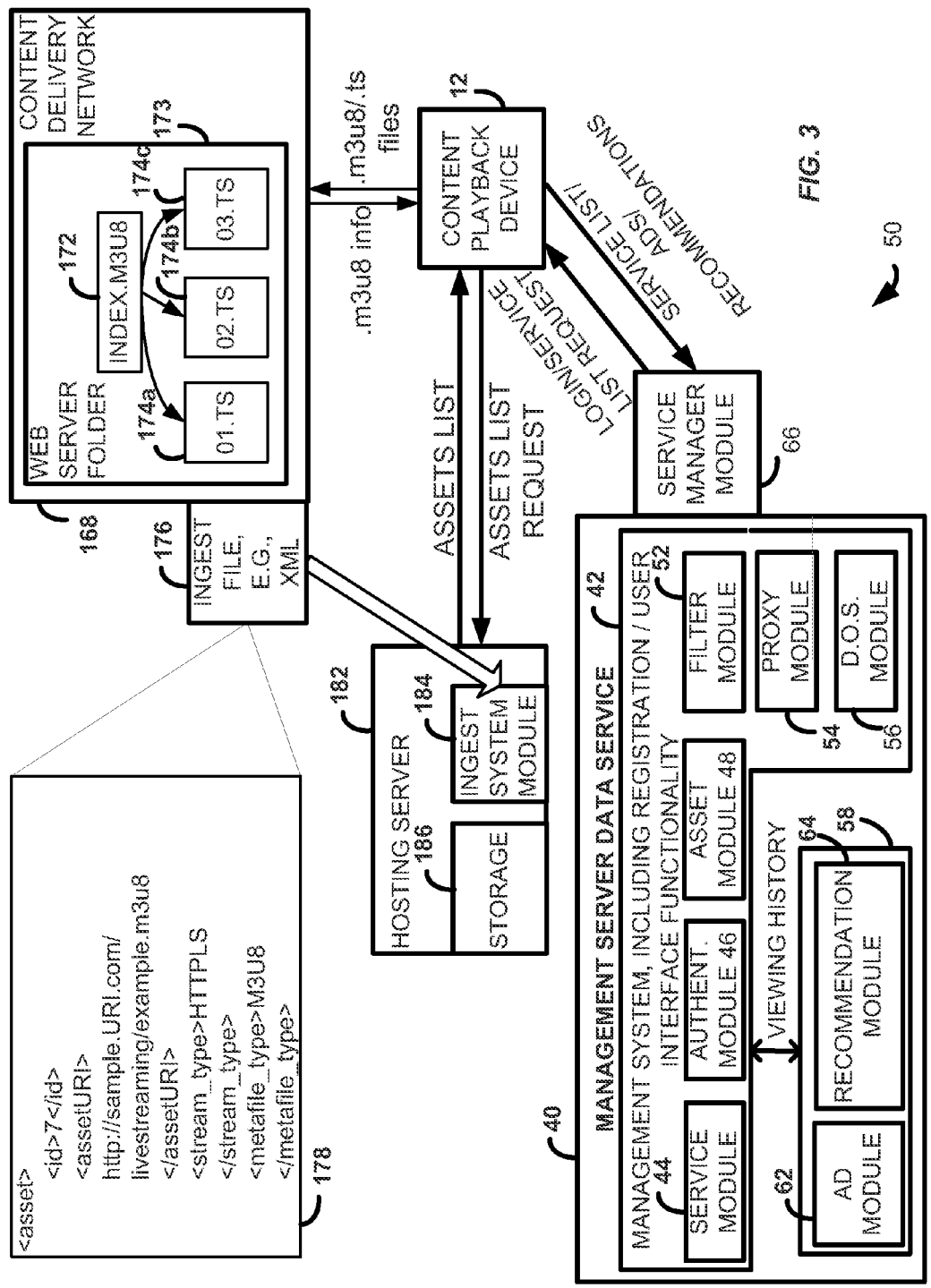
FIG. 3 is a block diagram of another exemplary system in accordance with an aspect of the present principles, illustrating a management server, hosting server, and content delivery network, which may be employed to host metadata, provide authentication and security, and arrange for delivery of streaming content to a content playback device.

For example, and referring to FIG. 3, a system 50 is illustrated in which the management server 40 is again illustrated, this time in conjunction with a hosting server 182. The functionality of modules of the management server 40 are in many ways the same as disclosed above in connection with FIG. 2, and such description is not repeated. As described above, a service provider may host content itself or may provide the same through a content delivery network 168, the latter being that illustrated in the figure. A web server folder 173 includes an index file 172 which provides URIs to various transport stream files 174a-174c. In the system of FIG. 3, metadata information about content items is formatted into an ingest file and the same is ingested into a hosting server, which then hosts the metadata.

The service provider creates an ingest file 176 which is communicated to an ingest system module 184 within the hosting server 182. The ingest system module 184 receives the metadata described in the ingest file 176 and stores the same in a storage 186 within the hosting server 182. In this way, the hosting server hosts the metadata for one or many service providers.

The hosting server may then handle authentication and security and may further return URIs to streaming content assets when requested. Additional details of the delivery of streaming content in a system including a hosting server are provided in the applications incorporated by reference.

An exemplary ingest file, described in XML (other formats may be supported such as JSON, YAML, etc), is illustrated by code section 178. As may be seen, information in the ingest file 176 may include an asset ID, an asset URI, a stream type, and a metafile type. In the exemplary code section 178, the asset is a live streaming asset with stream type HTTPLS and metafile type M3U8.

Besides the metadata described above, a service provider can specify in the asset metadata ingest file a schedule start and end time for an event, e.g., an HTTTP live streaming ("HLS") event. However, the actual start and end time may vary due to any number of unforeseeable circumstances, such as weather delays, emergencies, overtime, and the like. In systems and methods according to the principles described, an API is provided that polls a service provider for status of a live event. The polling system may perform several functions. One is to serve as an on-demand system to poll the service provider for the current status of an asset when triggered by a user and to cache the responses. In this way, the caching lessens the transactional traffic on the service provider. Another function is to serve as an off-line system to poll the service provider asynchronously from a server such as, e.g., the hosting server.

Figure 4:
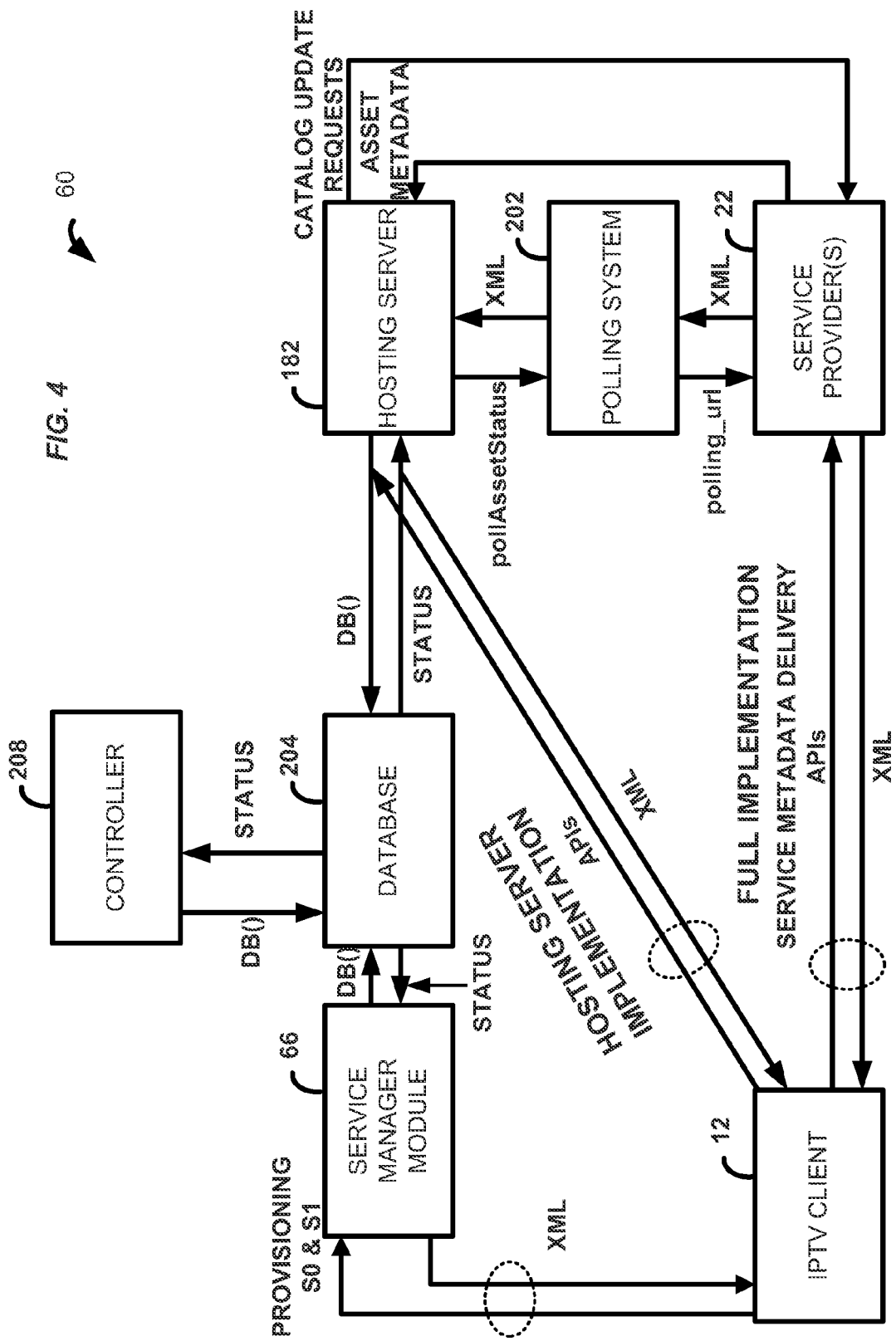
FIG. 4 is a block diagram of another exemplary system in accordance with the present principles, illustrating a polling system according to the principles described here.

Referring to FIG. 4, a system architecture 60 is depicted that illustrates two different implementations of polling methods. In one implementation, the hosting server 182 is employed that performs the functions described above. This implementation is appropriate for service providers who desire a turnkey solution and do not wish to develop the infrastructure for streaming content themselves. In another implementation, termed a "full implementation", a content playback device 12 may receive polling information to enhance the user experience directly from a service provider 22. Such is an appropriate implementation when the service provider is capable of providing the appropriate infrastructure for streaming content, including hosting metadata therefore.

A polling system 202 is situated as an intermediary system between the hosting server 182 and one or more service providers 22. The polling system 202 may serve as an on-demand system that polls the service provider synchronously for the current status of an asset when triggered by a user and may also cache the responses to reduce the request and subsequent traffic of the service provider server. The polling system 202 may also serve as an off-line system that polls the service provider's API asynchronously using the hosting server.

An IPTV client 12 establishes a user account session with the system through the service manager module 66 as described above, and the same can then access the database 204 which may be used by the hosting server 182. A controller 208 is employed to control the data stored by the hosting server, including how service providers can provide data to the same, including consideration of business rules, regions, software versions, and the like.

As in FIG. 3, a content playback device 12 may request an assets list or asset from the hosting server 182 using an appropriate API, and this call in turn causes the polling system 202 to poll a service provider 22 using its polling URL as indicated by the polling_url value, to request the status of a live event. Various parameters may be required, including service_id, which indicates the ID of the service assigned by the hosting server; asset_id, which indicates the ID of the asset on which status is requested; timestamp, which may be, e.g., a Unix timestamp, containing the date and time that the polling request was issued; and "sig", which is a signature generated on the URL string. An exemplary such call may be: http://www.example.com/pollingSystem/pollAssetStatus/?service_id=480&asset_id=5&timestamp=1313427625&sig=e591kdie9isdj342k129skdfs9fks.

An exemplary resulting XML file is:

```
<?xmlversion="1.0"encoding="utf-8"?>
<responsesys_ver="0" ingest_version="1">
<headerversion="01">
<command>pollAssetStatus</command>
<code>0</code>
</header>
<sony>
<polled_asset_list>
<polled_assetid="294">
<actual_event_start>RFC3339UTCdate/timeofevent
    start</actual_event_start>
<actual_event_end>RFC3339UTCdate/time of eventend
</actual_event_end>
<event_in_progress>0</event_in_progress>
</polled_asset>
</polled_asset_list>
</sony>
</response>
```

In the above XML file, a number of tags are listed. The <polled_asset_list> tag contains a list of assets for which status is requested, and has child tag <polled_asset>. The <polled_asset> tag contains a single asset for which status is requested, has parent <polled_asset_list>, and child tags <actual_event_start>, <actual_event_end>, and <event_in_progress>. "id" represents a unique record identifier string within the context of a specific service provider. <actual_event_start> contains the date relative to UTC when the asset actually starts. <actual_event_end> contains the date relative to UTC when the asset actually ends. <event_in_progress> indicates whether or not the asset is in progress. For this tag, a flag value of "1" may indicate that the asset has actually started, and a flag value of "0" may indicate that the asset as not actually started.

In an on-demand request, which may be triggered when a physical action has taken place such as the selection of an asset on the grid guide by a user, the hosting server makes a synchronous pollAssetStatus call to the polling system 202, which in turn makes a synchronous call to the polling_url value. In an off-line request, which may be triggered by the hosting server, the hosting server makes an asynchronous pollAssetStatus call to the polling system, which in turn makes an asynchronous call to the polling_url value.

Figure 5:
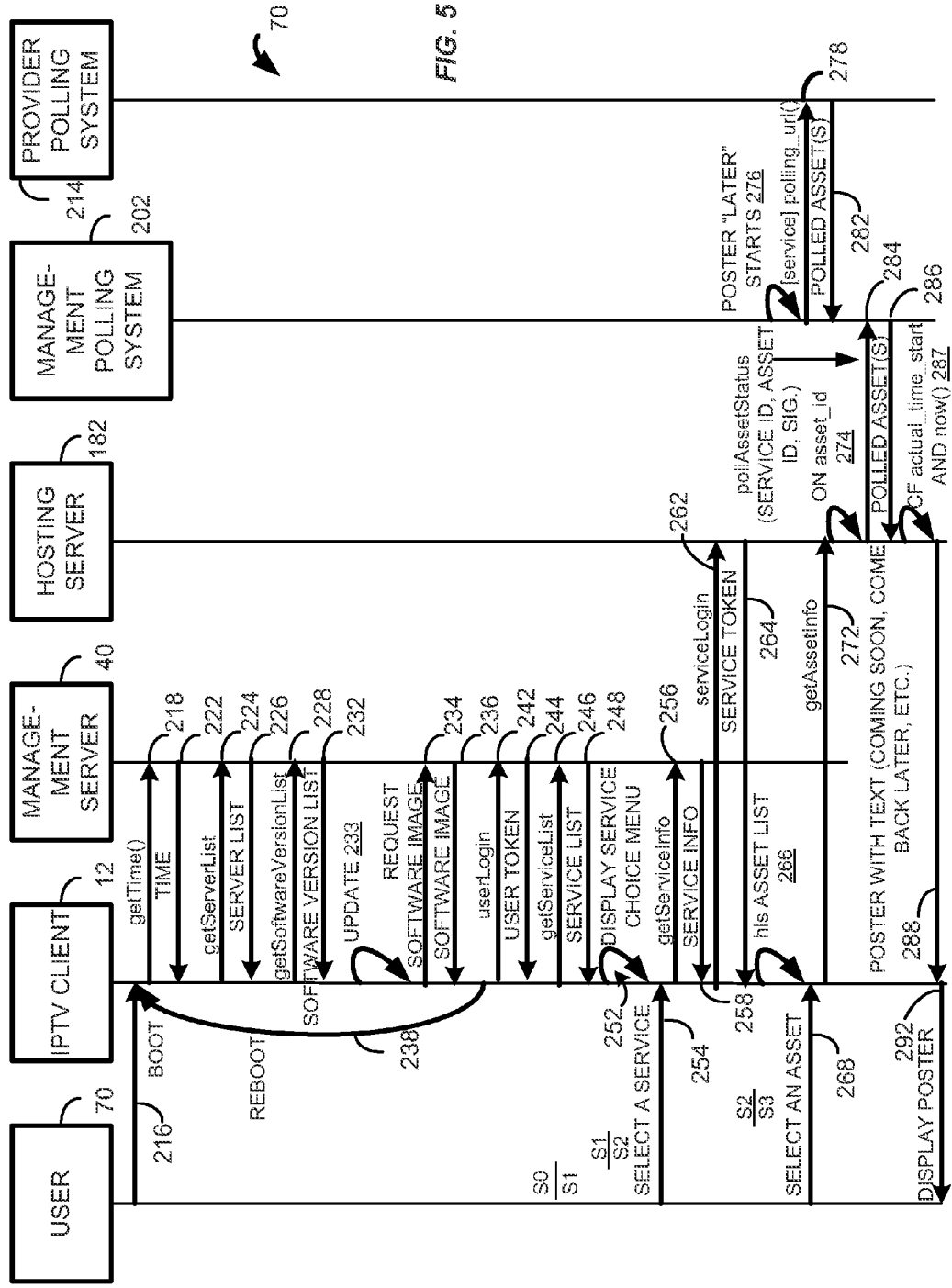
FIG. 5 is a sequence diagram illustrating a polling system according to an aspect of the principles described here.

Referring to the sequence diagram 70 of FIG. 5, various steps are illustrated as performed by the portrayed elements discussed above. In addition, the actions of a user 70 are illustrated along with a polling system 214 which operates on the service provider side.

In a first step, the user boots their content playback device, e.g., the IPTV client 12, in step 216. The system requests the time from the management server in step 218, and the time is returned in step 222. The client 12 requests a server list in step 224, and the request may include parameters such as tv_id, metafile_type, stream_type, container_type, and the like. The server list is returned in step 226. A check is made for the latest software version in step 228, the request may include similar parameters as above, and the same is returned in step 232. If necessary an update step 233 is performed. The client 12 requests a software image for a viewing and control application in step 234, and the same is returned in step 236. If necessary due to the software image, a reboot may occur.

Upon user login in step 242, which request may again include similar parameters as above, a user token is returned in step 244. The client 12 requests a list of services in step 246, the request may include similar parameters as above, and the same is returned in step 248. Step 252 illustrates an optional menu of different service choices, which upon selection by a user in step 244 causes a request for information about the selected service to be sent to the management server in step 256 (again potentially including similar parameters as above). Information about the service is returned in step 258. The client 12 requests login of the service in step 262, and if login is successful a service token is returned in step 264.

A live streaming asset list is then displayed, e.g., as a grid, on the client 12 in step 266. The user selects an asset in step 268. To view the asset, the IPTV client 12 provides similar parameters as above and retrieves asset information from the hosting server 182 in step 272.

At a time after step 264, i.e., once the desired service is known, information about assets available on the service may be displayed. For example, information about upcoming live streaming events may be displayed. Alternatively, such information may be displayed only about a given asset after selection by the user. In this regard, the display may be configurable by the user, set by default, or chosen by the service provider. In any case, a poster which indicating a time period such as "LATER" may be displayed in step 276, with respect to the one or several assets. The service may begin polling in step 278 using polling_url, and a list with data about polled assets may be returned in step 282. As noted above, the polling_url value is generally provided in the ingest file to the hosting server.

The user selects an asset using their client device 12 in step 268, and the same requests information about the asset in step 272, the request being made to the hosting server 182. The hosting server uses pollAssetStatus in step 284 to obtain information about assets from the polling system 202, and the same may further be obtained using asset_id in step 274. That is, when the polling system receives a polling request, it creates an instance formerly known as asset_id. The list of one or more polled assets is returned in step 286. A comparison may then be made of the actual_time_start and now() in step 287, and the results of the comparison used to inform a poster in step 288 on the client 12. The text may indicate "coming soon", "come back later", or the like. The text is displayed via the poster in step 292.

Figure 6:
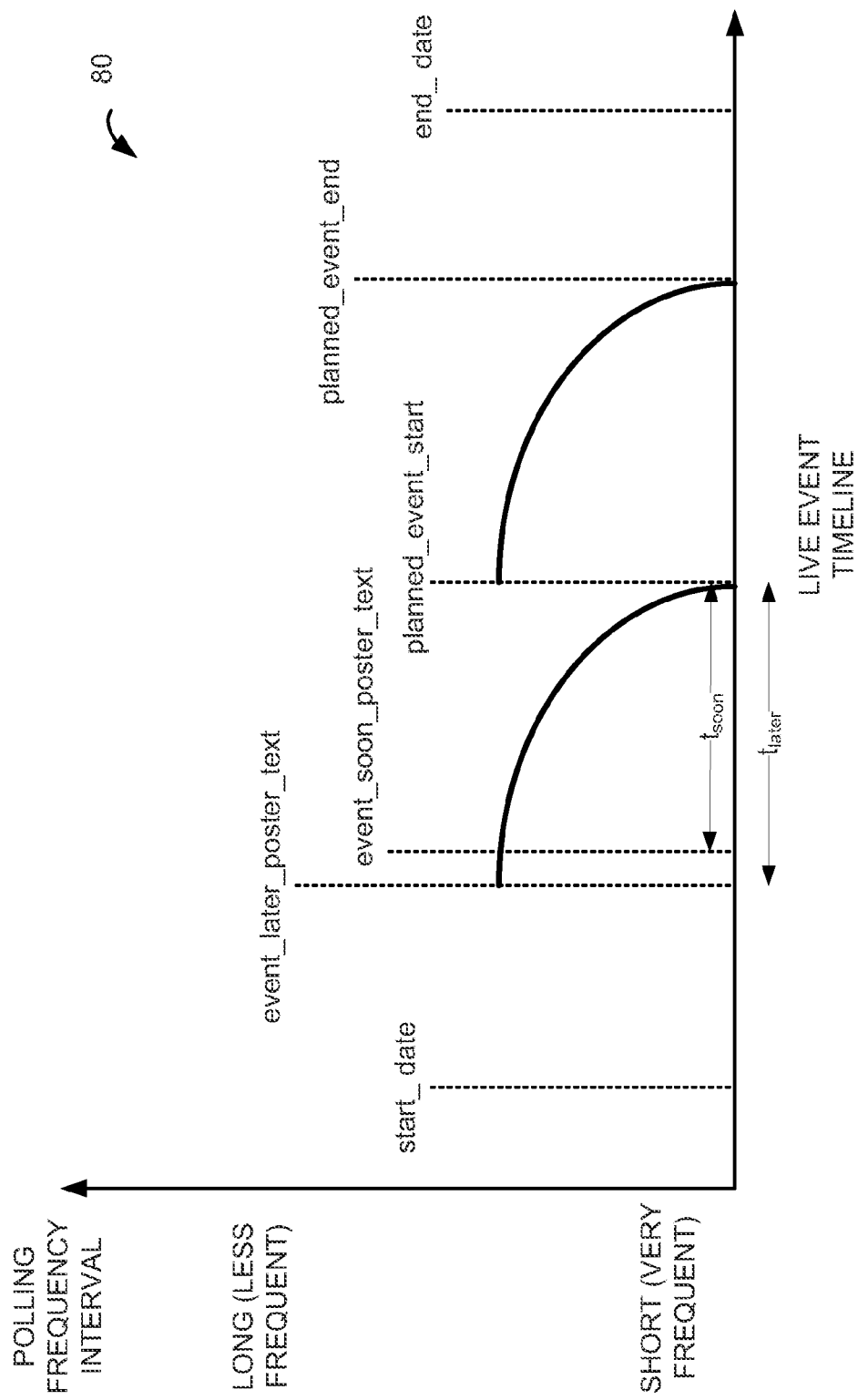
FIG. 6 illustrates a polling frequency model capturing polling of a live event on-demand upon the selection of a live event by a user.

The graph 80 of FIG. 6 illustrates a model capturing the polling frequency of a live event. The frequency corresponds to occurrences of an on-demand polling request, before or upon the selection of the live event from, e.g., a grid guide display to a user. The y-axis indicates a polling frequency interval, ranging from a short interval, corresponding to frequent requests, to a long interval, corresponding to less frequent requests.

On the x-axis is illustrated a timeline for the live event, e.g., an HLS asset. A scheduled start time is illustrated by planned_event_start, and a poster indicating "LATER" is posted a time period $t_{later}$ prior to this scheduled start time. A poster indicating "SOON" is posted a time period $t_{soon}$ prior to the scheduled start time. As may be seen, the frequency of polling may in one implementation increase monotonically as the time period between the current time and the planned_event_start decreases. A similar polling is performed at the end of the event, to ensure that viewing is not inadvertently cut off at a scheduled end time. In this way, viewing may continue past the planned_event_end if necessary, e.g., because of overtime, delays, and the like.

Figure 7:
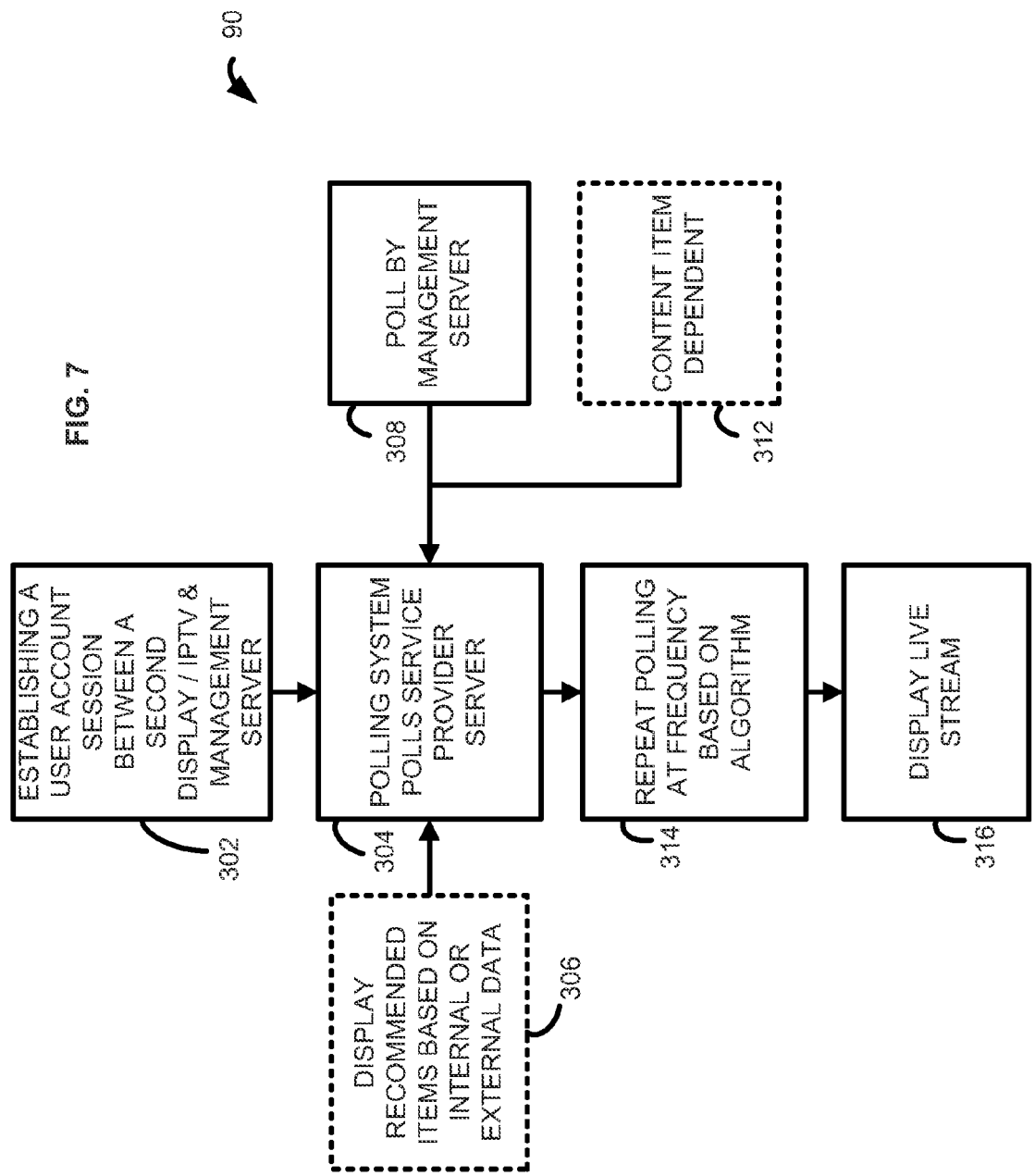
FIG. 7 is a flowchart illustrating an exemplary method according to another aspect of the present principles, the method for polling a service provider, the method performed on the client side, e.g., from a second display or content playback device.

FIG. 7 illustrates a flowchart 90 of a client-side method for enhancing the viewer's experience using the principles described here. A first step is that a management server receives a login and authentication request from a second display or content playback device, and in this way a user account session is established between the two components (step 302). The management server may provide a set of available live streaming assets to be displayed on the content playback device. When one of the assets within the service reaches a time event_later_poster_text, the polling system begins polling at an interval specified by the supervised machine learning algorithm. This time may be specified and configurable by the management server, the service provider, or another source.

In this way, the polling system polls a service provider server (step 304) for the status of assets associated with the service provider. In general, the polling may be performed by a management server (step 308), a proxy server, the hosting server, or other such computing environment. Where a user has selected a content item, the polling system may focus on that content item or asset in its polling (step 312). The management or proxy server, generally having data available about user profiles and preferences, as well as browsing and purchase transaction history, may display items that are determined or calculated to be likely of interest to the user (step 306). Additional details of such personalization aspects are detailed below in connection with FIG. 9.

The polling may be repeated at a calculated frequency, which may be determined by an algorithm such as a supervised machine learning algorithm, the frequency in one implementation inversely proportional to a time difference between a current time and a scheduled start time (step 314). For example, the polling at the specified frequency may begin when the event reaches the event_soon_poster_text time.

When the user selects the asset, the most up-to-date information may be presented to the user via a poster, such as relating to changes, delays, rescheduling, blackouts, or the like. Such information may also be the subject of the notifications described below. When an event reaches even closer to the planned_event_start time, the polling system may increase significantly the polling frequency, again according to the algorithm. In this way, the system verifies that the event is still planned to start at the scheduled time. When the event reaches the planned_event_start time, the polling system may cease polling.

Once the event has started, the live stream may be displayed (step 316). As noted, when an event reaches a point in time close to the planned_event_end time, the polling system again polls according to the model.

Where the service provider server is polled prior to asset selection, information may be provided on a number of different assets that are scheduled to be streamed. In addition, where a service provider is polled prior to asset selection, the most up-to-date information may be displayed following the user selection. In other words, up-to-date information is presented to the user, enhancing the user experience, because information from such polling has already been obtained. In this way, no or little on-demand polling need be performed.

Figure 8:
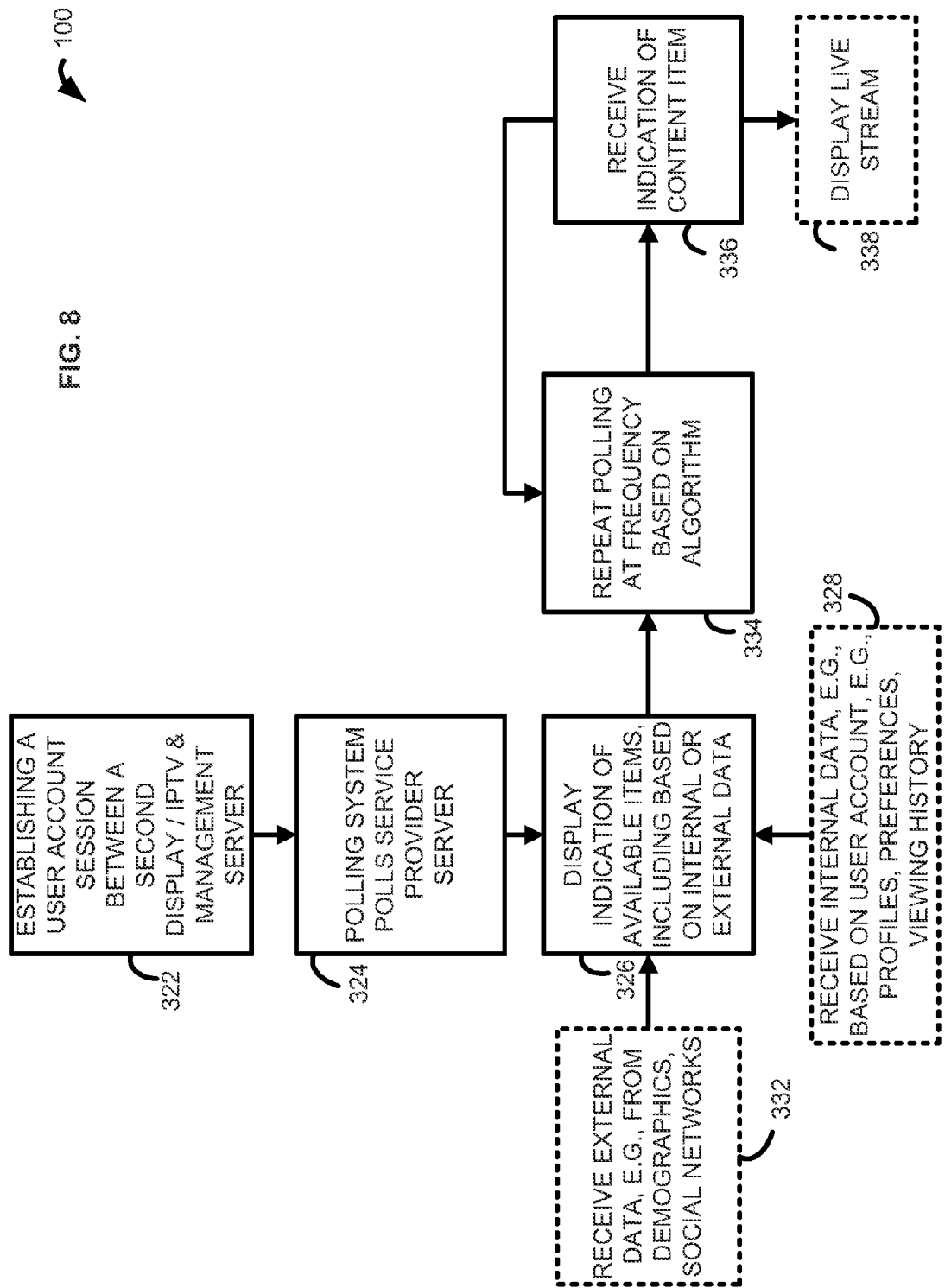
FIG. 8 is a flowchart illustrating an exemplary method according to another aspect of the present principles, the method for polling a service provider server, the method performed on a server side, e.g., from a management or proxy server.

FIG. 8 illustrates a flowchart 100 of a server-side method for enhancing the viewer's experience using the principles described here. A first step is that a management server receives a login and authentication request from a second display or content playback device, and in this way a user account session is established between the two components (step 322). As above, the management server may provide a set of available live streaming assets to be displayed on the content playback device. When one of the assets within the service reaches a time event_later_poster_text, the polling system begins polling at the interval specified by the supervised machine learning algorithm.

The polling system polls a service provider server (step 324) for the status of assets associated with the service provider. Available assets may be indicated (step 326) in a display, e.g., on a grid, and the assets displayed may be by default or may be chosen for the user based on external data (step 332), e.g., on data stored in a user profile, preferences, or in a social network. Assets displayed may further be based on "internal" data, e.g., data stored in a user account (step 328). Other such data are discussed with respect to FIG. 9.

The polling may be repeated at a calculated frequency as determined by an algorithm such as a supervised machine learning algorithm, the frequency in one implementation inversely proportional to a time difference between a current time and a scheduled start time (step 334).

When the user selects the asset, the server receives an indication of the selection (step 336), and the most up-to-date information may be transmitted to the user for display, such as relating to changes, delays, rescheduling, blackouts, or the like. Once the event has started, the live stream may be caused to be delivered to the content playback device (step 338).

Variations of the above method are now described.

To more fully enhance a user's viewing experience, refinements may be made to the way polling is performed, the selection of content items displayed, and ways of notifying users of start and end times. These refinements may take advantage of various sources of data, internal to the user account and external. For example, to enhance the specificity of the text of posters displayed on client devices, either on a grid or on a page devoted to the event, as well as to indicate when an actual event start date is occurring, an event signal source may be employed. The same may be manually provided, from, e.g., a producer at the event, or the same may employ machine vision or other optical recognition techniques to automatically detect when one or more features of an event are occurring. For example, the enhanced specificity may include information about events taking place, e.g., for sporting events, a pregame show, half-time, a kick-off, or the like. For concerts, such event data may indicate a starting set of a warm-up band, a starting set of the main attraction, or the like.

Figure 9:
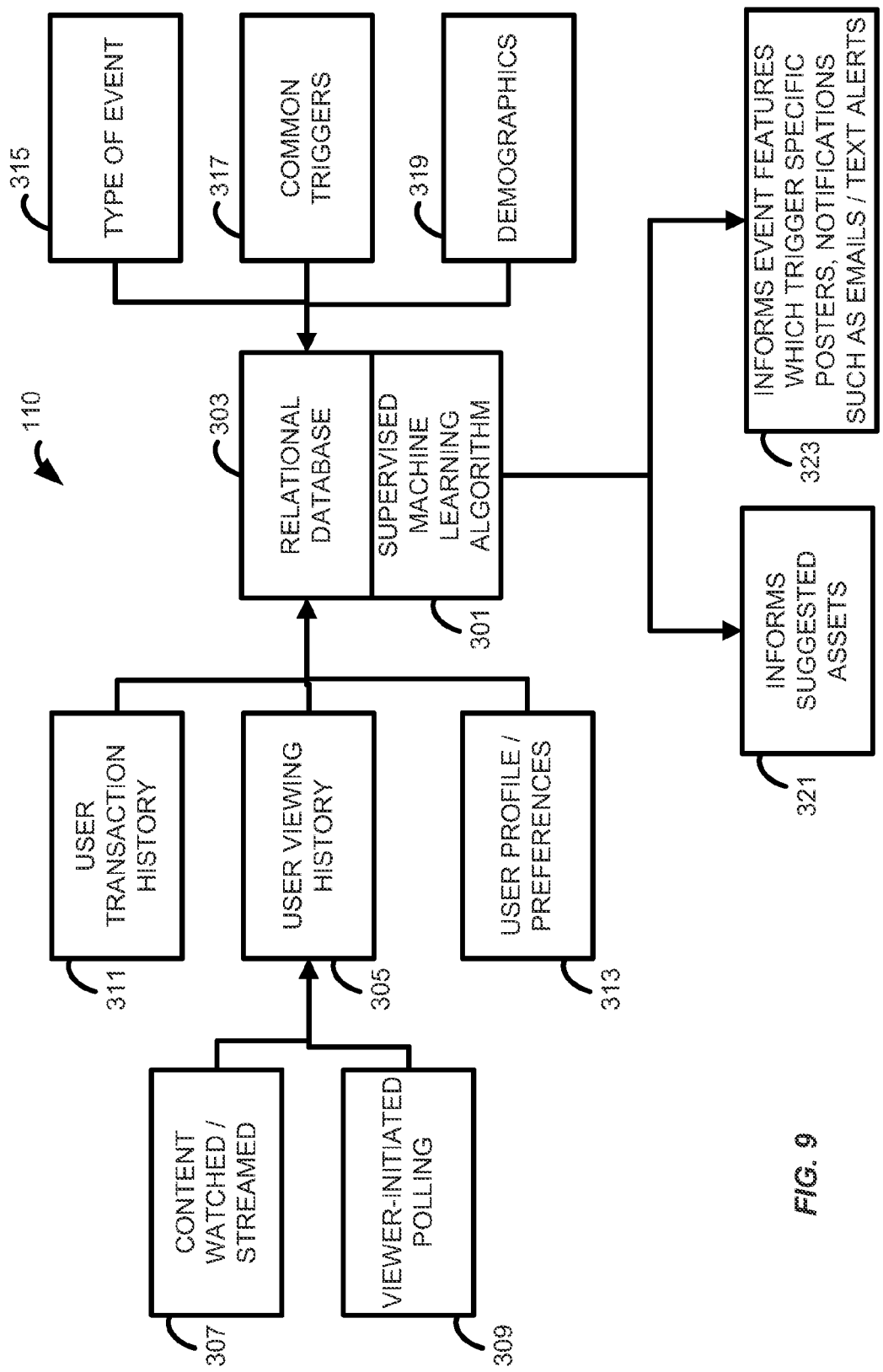
FIG. 9 is a chart illustrating various types of data which may be employed in an algorithm, e.g., a supervised machine learning algorithm, according to principles disclosed here.
Figure 10:
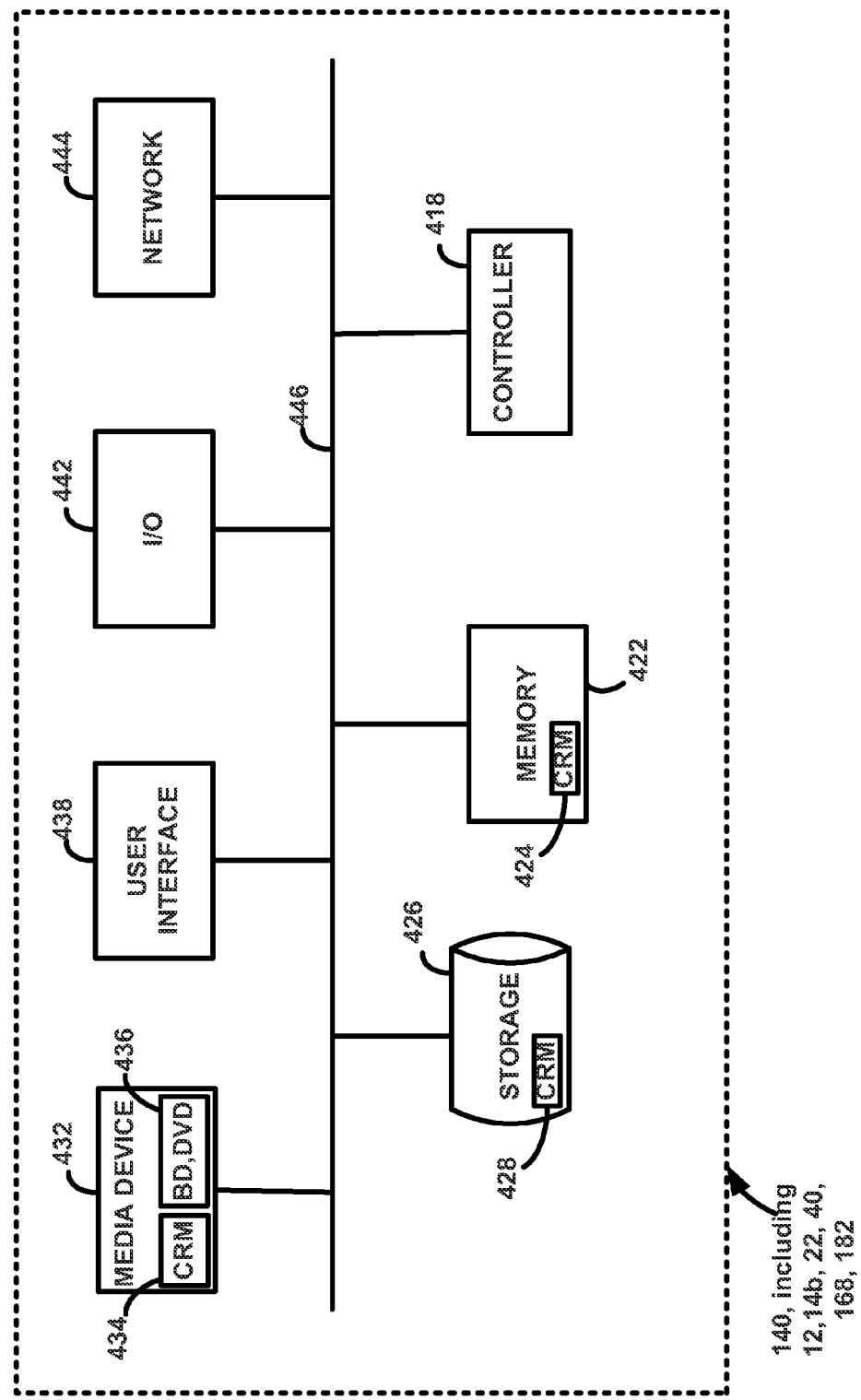

Referring to the system 110 of FIG. 9, various types of data are illustrated which may serve as inputs to an algorithm 301, in addition to the model of polling frequency described above. In one implementation, the algorithm is a supervised machine learning algorithm 301 which operates on data stored in a relational database 303. It will be understood that other types of databases be employed. In addition, besides machine learning, other types of analyses may be performed on databases to determine potential content items, as well as features within events that may be of interest to users. Such other types of analyses include rules-based systems, neural networks, Bayesian systems, and the like.

One source of data for the relational database 303 is a user viewing history 305. Such may include a history 307 of content watched or streamed, as well as analysis 309 from viewer initiated polling. In other words, if the viewer is "parked" on a page, waiting for an event to begin, and refreshes the page a significant number of times, it may be inferred that the viewer is highly interested in that type of event. It may also be inferred that the polling frequency is too low. Conversely, if a viewer is streaming an event but performs little or no input during the same, it may be inferred that the viewer has a lesser degree of interest in that type of event.

Such may also provide data which may be employed to determine likely triggers for notifications. For example, while watching the Olympics, if a user always tunes in to a specific event, or always tunes in to watch a specific athlete, such may be employed to suggest other likely events of interest, as well as to suggest at what point during the event the user is likely to desire a notification, e.g., the actual event versus pregame festivities.

The user transaction history 311 may also be employed, the same indicating content the viewer has purchased or rented for consumption. Data stored in a user profile or preferences 313 may also be employed. In other implementations, not shown in the figure, data from a social networking site may be employed as an input to the supervised machine learning algorithm 301.

The above indicate data sources that are user-based. Other data sources may also be employed that are not unique to the user. For example, the polling frequency may take into account the type of event 315. For example, a football game may have a high threshold of timeliness, while a nature program less so. Demographic data 319 may be used for recommendations and triggers for notifications to the extent such data are available. A set of common triggers 317 may be developed, such as halftime or kickoffs, and the same may be employed to suggest desired times at which to notify the user.

Using these data sources, a unique but dynamic probability density function may be developed for the user, and the same employed to inform recommendations or suggestions 321 for content items and assets, advertising, and the like. The same may also be used to inform event features 323 which trigger specific posters, notifications, or the like. In other words, notifications of the start of a content item may be delivered to a user by way of text messaging, e-mailing, an announcement over an audio system, or the like. So long as such devices are associated with the infrastructure including the service provider, e.g., through the local network, the same may be used for notifications. In a similar way as above, such notifications may be provided for the end of an event as well. Such notifications are helpful to a user in many ways, e.g., allowing the user to be notified when a desired aspect is to occur, rather than otherwise requiring the user to watch an entire event just to see the particular aspect of interest.

Details of certain components will now be described.

The content playback device 12 can take many forms, and multiple content playback devices can be coupled to and selected from within a given local network. Exemplary content playback devices may include, e.g., an IPTV, a digital TV, a digital sound system, a digital entertainment system, a digital video recorder, a video disc player, a combination of these, or any number of other electronic devices addressable by a user on the local network 16 and capable of delivering content over the Internet 26. The same may also include more traditional video and audio systems that have been appropriately configured for connectivity. For the sake of simplicity, in this specification, the content playback device 12 has generally been exemplified by an IPTV, in which case the same will generally include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on various memories to undertake present principles. The processor can receive user input signals from various input devices including a second display, a remote control device, a point-and-click device such as a mouse, a keypad, etc. A TV tuner may be provided in some implementations, particularly when the content playback device 12 is an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the Internet 26, or between the second display and the Internet, may also take place through means besides the local network 16. For example, the second display may communicate with the content playback device 12 through a separate mobile network.

The one or more second displays each bear a processor and components necessary to operate an application for service provider and content selection. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on various memories to undertake present principles. The second display 14i can receive user input signals from various input devices including a point-and-click device such as a mouse, a keypad, a touch screen, a remote control, etc. A network interface such as a wired or wireless modem communicates with the processor to provide connectivity to wide area networks such as the Internet 26 as noted above.

The servers, e.g., the management server 40 and service provider server 22, have respective processors accessing respective computer-readable storage media which may be, without limitation, disk-based and/or solid state storage. The servers communicate with a wide area network such as the Internet 26 via respective network interfaces. The servers may mutually communicate via the Internet 26. In some implementations, two or more of the servers may be located on the same local network, in which case they may communicate with each other through the local network without accessing the Internet.

Systems and methods have been disclosed that allow improvement of the user experience of the IPTV. As disclosed above, users may employ the system and method to improve the user experience while waiting for streamed content that is yet to start. The system and method involve a model of polling a live streaming event by a management server of a service provider server and using that model to feed into future polling. The polling response returns up-to-date information about the event.

One implementation includes one or more programmable processors and corresponding computing system components to store and execute computer instructions, such as to execute the code that provides the various server functionality, e.g., that of the second display 14i, content playback device 12, hosting server 182, management server 40, or service provider server 22. Referring to FIG. 9, a representation of an exemplary computing environment 140 for a server, second display or other such computing device is illustrated.

The computing environment 140 includes a controller 418, a memory 422, storage 426, a media device 432, a user interface 438, an input/output (I/O) interface 442, and a network interface 444. The components are interconnected by a common bus 466. Alternatively, different connection configurations can be used, such as a star pattern with the controller at the center.

The controller 418 includes a programmable processor and controls the operation of the servers and their components. The controller 418 loads instructions from the memory 422 or an embedded controller memory (not shown) and executes these instructions to control the system.

Memory 422, which may include non-transitory computer-readable memory 424, stores data temporarily for use by the other components of the system. In one implementation, the memory 422 is implemented as DRAM. In other implementations, the memory 422 also includes long-term or permanent memory, such as flash memory and/or ROM.

Storage 426, which may include non-transitory computer-readable memory 428, stores data temporarily or long-term for use by other components of the servers, such as for storing data used by the system. In one implementation, the storage 426 is a hard disc drive or a solid state drive.

The media device 432, which may include non-transitory computer-readable memory 434, receives removable media and reads and/or writes data to the inserted media. In one implementation, the media device 432 is an optical disc drive or disc burner, e.g., a writable Blu-ray® disc drive 436.

The user interface 438 includes components for accepting user input, e.g., the user indication of streaming content items, and presenting service lists, asset lists or grids, and individual asset pages to the user. In one implementation, the user interface 438 includes a keyboard, a mouse, audio speakers, and a display. The controller 418 uses input from the user to adjust the operation of the servers.

The I/O interface 442 includes one or more I/O ports to connect to corresponding I/O devices, such as external storage or supplemental devices, e.g., a printer or a PDA. In one implementation, the ports of the I/O interface 442 include ports such as: USB ports, PCMCIA ports, serial ports, and/or parallel ports. In another implementation, the I/O interface 442 includes a wireless interface for wireless communication with external devices. These I/O interfaces may be employed to connect to one or more content playback devices.

The network interface 444 allows connections with the local network and optionally with content playback device 12 and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The servers and the second displays may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and are within the scope of the present invention. For example, while live streamed events have been the focus of embodiments disclosed above, it will be understood that the broadcast of pre-recorded streamed events may also benefit from the systems and methods according to the principles described here. While some implementations have described content as being delivered from a service provider server, it will be understood that generally such content may be provided by way of a content delivery network associated with the service provider. In addition, while use of a hosting server has been discussed, in some implementations the same may be omitted. The systems and methods may be applied to stream content items that are imminent as well as those displayed well in advance of their scheduled or actual start times. User preference and profile information, including the probability density function described above, may be used and maintained across services as well as for any particular service. Systems and methods according to the principles described here may not only suggest content for viewing based on the types of data disclosed, but may even record such content automatically.

Accordingly, the present invention is not limited to only those implementations described above.

The invention claimed is:

1. A method for improving a viewing experience of a user with respect to a live streamed asset, comprising:
   a. establishing a user account session between a second display or content playback device and a management server;
   b. using a polling system, polling a service provider server to determine if real-time streaming of a live event has begun, the event associated with a scheduled starting time; and
   c. if the real time streaming of the live event has not begun, displaying an indication on a user interface associated with the second display or content playback device, the indication at least in part dependent on the time difference between a current time and the scheduled starting time of the live event, and repeating the polling at a frequency, the frequency at least in part based on the time difference between the current time and the scheduled starting time of the live event, wherein the frequency is inversely proportional and is monotonically varying with respect to the time difference between the current time and the scheduled starting time of the live event.

2. The method of claim 1, wherein the polling system is associated with a hosting server, a management server, or a service provider server.

3. The method of claim 1, wherein the polling is performed in response to a selection of an asset associated with the event.

4. The method of claim 3, further comprising if the real time streaming of the live event has begun, initiating display of the asset.

5. The method of claim 1, further comprising displaying a plurality of indications on the user interface of the second display or content playback device, the plurality of indications associated with a respective plurality of potentially available assets.

6. The method of claim 1, wherein the frequency is determined by a supervised machine learning algorithm.

7. A non-transitory computer-readable medium, comprising instructions for causing a computing device to implement the method of claim 1.

8. The method of claim 1, further comprising:
   b. receiving an indication from the second display or content playback device of an asset to be streamed; and
   if the streaming has begun, displaying an indication of an availability of the asset on a user interface of the second display or content playback device;
   d.

9. The method of claim 1, wherein the indication is further dependent on external data.

10. The method of claim 9, wherein the external data includes a signal from an event signal source at the live event, the signal indicating when real-time streaming of the live event is to begin.

11. A method for improving a viewing experience of a user of an asset of a live event, comprising:
    a. polling a service provider server to determine if a real time streaming of an asset corresponding to a live event has begun, the live event associated with a scheduled starting time;
    b. if the real time streaming of the live event has begun, displaying an indication of an availability of the asset corresponding to the real-time streaming of the live event on a user interface of at least one second display or content playback device; and
    c. if the real time streaming of the live event has not begun, displaying an indication on a user interface of at least one second display or content playback device, the indication at least in part dependent on the time difference between a current time and the scheduled starting time of the live event, and repeating the polling at a frequency, the frequency determined at least in part based on the time difference between the current time and the scheduled starting time of the live event, wherein the frequency is inversely proportional and is monotonically varying with respect to the time difference between the current time and the scheduled starting time of the live event.

12. The method of claim 11, wherein the frequency is determined by a supervised machine learning algorithm.

13. The method of claim 11, wherein the displaying an indication further comprises choosing an indication to display based on information associated with the user.

14. The method of claim 13, wherein the information includes a user profile, a user transaction or browsing or watching history, user preferences, or user information in a social networking site.

15. The method of claim 11, further comprising notifying a user of an aspect of an event, the notifying by way of a poster, a text message, an email, or an audio announcement.

16. The method of claim 15, wherein the notifying further comprises determining an aspect to notify about, the aspect determined by analysis of at least a user's viewing history.

17. The method of claim 11, wherein the polling begins at a first predetermined time prior to the scheduled starting time.

18. A non-transitory computer-readable medium, comprising instructions for causing a computing device to implement the method of claim 11.

19. A method for improving a viewing experience of a user of an asset of a live event, comprising:
    a. polling a service provider server to determine if a real time streaming of an asset corresponding to a live event has begun, the live event associated with a scheduled starting time;
    b. if the real time streaming of the live event has begun, displaying an indication of an availability of the asset corresponding to the real-time streaming of the live event on a user interface of at least one second display or content playback device; and c. if the real time streaming of the live event has not begun, displaying an indication on a user interface of at least one second display or content playback device, the indication at least in part dependent on the time difference between a current time and the scheduled starting time of the live event, and repeating the polling at a frequency, the frequency determined at least in part based on the time difference between the current time and the scheduled starting time of the live event, wherein the polling begins at a first predetermined time prior to the scheduled starting time, and further comprising:

d. at a second predetermined time prior to a scheduled end time, performing polling to determine if streaming of the live event asset has concluded or if a new end time is projected; and e. repeating the polling at a second frequency, the second frequency inversely proportional to the time difference between the current time and the scheduled end time of the live event asset or the new end time, respectively.

* * * * *